United States Patent
Galimberti et al.

(10) Patent No.: US 6,331,600 B1
(45) Date of Patent: *Dec. 18, 2001

(54) ELASTOMERIC COPOLYMERS OF ETHYLENE AND PROPYLENE

(75) Inventors: Maurizio Galimberti, Milan; Enrico Albizzati, Arona, both of (IT)

(73) Assignee: Basell Technology Company bv, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,473

(22) Filed: Apr. 22, 1997

Related U.S. Application Data

(63) Continuation of application No. 08/587,605, filed on Jan. 3, 1996, now abandoned, which is a continuation of application No. 08/461,410, filed on Jun. 5, 1995, now abandoned, which is a continuation of application No. 08/239,768, filed on May 9, 1994, now abandoned.

(30) Foreign Application Priority Data

Jun. 30, 1993 (IT) .............................. M193A1406

(51) Int. Cl.⁷ .......................... C08F 210/16; C08F 4/64
(52) U.S. Cl. ................. 526/160; 526/281; 526/282; 526/943
(58) Field of Search .................... 526/281, 282, 526/160, 943

(56) References Cited

U.S. PATENT DOCUMENTS

| | | | |
|---|---|---|---|
| 4,298,721 | 11/1981 | Borghi et al. | 526/348 |
| 5,229,478 | * 7/1993 | Floyd et al. | 526/160 |

FOREIGN PATENT DOCUMENTS

| | | |
|---|---|---|
| 0 129 414 | 12/1984 | (EP) . |
| 347128 | 12/1989 | (EP) . |
| 347129 | 12/1989 | (EP) . |
| 0 524 624 | 1/1993 | (EP) . |
| 0 575 875 | 12/1993 | (EP) . |
| A-93 19107 | 12/1993 | (WO) . |

OTHER PUBLICATIONS

Soga, K., et al., "Effect of Catalyst Isospecificity on Olefin Copolymerization," *Makromolekulare Chemie*, 191, (1990) Dec., No. 12, pp. 2853–2864.

European Search Report, dated Aug. 30, 1994 of EP 94 10 6976.

Soga, K. et al, "Effect of Catalyst Isospecificity On Olefin Copolymerization", Makromol. Chem. 191, 2853–2864.

European Search Report, dated Oct. 13, 1994 of EP 94 10 6974.

* cited by examiner

*Primary Examiner*—Donald R. Wilson
(74) *Attorney, Agent, or Firm*—Bryan Cave LLP

(57) ABSTRACT

Novel copolymers of ethylene with propylene and optionally with minor proportions of a diene or polyene having good elastomeric properties in their uncured state. The copolymers are characterized by a structure in which the propylene is partially present in the form of short isotactic sequences. Tension set values (200%) of less than 15 are obtained by when the ethylene/propylene ratio has specific values and the intrinsic viscosity values are higher than 3.

11 Claims, No Drawings

ELASTOMERIC COPOLYMERS OF ETHYLENE AND PROPYLENE

This is a continuation of U.S. application Ser. No. 08/587,605 filed Jan. 3, 1996, now abandoned, which was a continuation of U.S. application Ser. No. 08/461,410, filed Jun. 5, 1995, now abandoned, which was a continuation of U.S. application Ser. No. 08/239,768, filed May 9, 1994, now abandoned.

The present invention relates to novel copolymers of ethylene with propylene and optionally with minor proportions of a diene or polyene having good elastomeric properties in their uncured state.

The EP and EPDM rubbers, elastomeric copolymers of ethylene with propylene and minor proportions of a diene or polyene respectively, are well known products in the state of the art.

These copolymers are generally prepared by polymerising a mixture of ethylene and propylene and optionally diene or polyene with Ziegler-Natta catalysts obtained from vanadium compounds, such as acetylacetonate, and alkyl aluminium halides.

The copolymers so obtained necessitate a vulcanisation treatment (with peroxide or sulphur) in order to acquire elastomeric behaviour of interest in industrial applications. In the their uncured state they are not endowed with elastomeric properties of interest.

Thermoplastic polyolefin rubbers (TPO) are known, which are capable of maintaining the processability characteristics of the thermoplastic polymers and at the same time are endowed with an elastomeric behaviour. These rubbers are obtained by high temperatures dynamic vulcanisation of blends of the crystalline polymer, in particular isotactic polypropylene, with EP or EPDM rubbers in the presence of crosslinking agents.

Copolymers endowed with a certain level of elastoplastic properties are known, obtained by polymerisation of mixtures of propylene with minor proportions of ethylene using a catalyst based on a titanium compound supported on magnesium dichloride (U.S. Pat. No. 4,298,721). These copolymers are characterised by a high crystallinity content of polypropylenic type, and optionally of polyethylenic type; the elastomeric properties of these copolymers are unsatisfactory (200% tension set values are too high).

Preparing elastomeric copolymers of ethylene with propylene and/or with α-olefins and optionally with minor proportion of a diene or polyene by means of the polymerization of mixtures of monomers with homogeneous catalysts obtained from Ti, Zr or Hf metallocenes and alumoxane compounds, is known.

European Patent Application EP-A-347128 describes a process for the preparation of elastomeric copolymers of ethylene with α-olefins in which the catalyst used is the product obtained from the reaction of bridged dicyclopentadienyl —Zr, —Ti or Hf compounds, such as ethylene-bis(indenyl)-zirconium dichloride or ethylene-bis(tetrahydroindenyl)-zirconium dichloride or dimethylsilanylene-bis(tetrahydroindenyl)-zirconium dichloride, with polymethyl-alumoxane.

The polymerisation is carried out in liquid monomer at a temperature between 0° and 80° C., preferably between 20° and 60° C.

European Patent Application EP-A-347129 describes a process for the preparation of elastomeric copolymers of ethylene with α-olefins containing minor proportions of a non-conjugated diene, analogous to the one disclosed in European Patent Application EPA-347128.

None of the copolymers disclosed in both the above cited EP applications or in the examples shows satisfactory elastoplastic properties in the non-vulcanized state. 200% tension set values are higher than 30% and the tensile strength is lower than 4–5 Mpa.

Until now, no copolymers of ethylene with propylene, optionally containing units deriving from dienes or polyenes, are known that have elastomeric properties of interest in their uncured state, in particular tension set values at 200%, 1 min, 25° C., of less than 15%. The tension set is determined according to the subsequently reported method.

It has now been unexpectedly found that, using particular catalysts and carrying out the polymerisation in solvents, it is possible to synthesise ethylene-propylene copolymers having the above indicated elastomeric properties.

The copolymers have an ethylene content comprised between 55 and 70% by weight, preferably between 58 and 65% by weight, a content of propylene between 30 and 45% by weight, preferably between 35 and 42% by weight, and a content of diene or polyene comprised between 0 and 10% by weight.

The copolymers are characterized by:
solubility in pentane at 25° C. higher than 95%;
substantial absence of crystallinity (fusion enthalpy lower than 15 J/g);
content of propylenic units in the form of triads comprised between 3 and 10% of propylene; at least 70% of said triads display an isotactic structure;

The content of diene or polyene units is generally comprised between 0 and 10% by weight, preferably 0.5 and 5% by weight.

The molecular weight distribution is very narrow; in particular the $M_w/M_n$ ratio has relatively low values, generally less than 4, and preferably less than 3.

The copolymers of the invention are additionally characterised by an appropriate distribution of ethylene and propylene units in the macromolecular chain (values of the product of the comonomer reactivity ratios from 0.4 to 0.6.

The copolymers have an inherent viscosity higher than 3 dl/g, preferably higher than 3.5 dl/g.

In order to obtain good elastomeric properties in the uncured state, the content of ethylene and the intrinsic viscosity are particularly important parameters; copolymers having the same structure in terms of propylene content in the form of triads and in terms of the value of the product of the reactivity ratios and having a content of ethylene and intrinsic viscosity outside the values claimed, do not show interesting elastomeric properties in the uncured state, in particular they do not show tension set values at 200% of less than 15.

The copolymers of the invention, obtained by a process in solution, are additionally characterised by a good composite uniformity that can be demonstrated by solvent fractionation. Composite uniformity at such levels is not obtained when operating in liquid propylene.

The copolymers can be transformed into shaped articles by means of the normal processes of manufacturing of thermoplastic materials (compression moulding, extrusion, injection moulding, etc.) and the resulting articles display elastic properties comparable to those of vulcanized rubbers.

The copolymers of the invention are prepared by polymerising a mixture of ethylene and propylene, optionally in the presence of diene or polyene, with chiral catalysts obtained from zirconium metallocene derivatives such as ethylene-bis(tetrahydroindenyl)-zirconium dichloride or dimethylsilanyl-ene-bis(tetrahydroindenyl)-zirconium dichloride and an alkyl aluminium operating in an inert hydrocarbon solvent and in the presence of water in such quantities that the molar ratio of Al/H$_2$O is higher than 1:1 and lower than 100:1 and preferably comprised between 1:1 and 50:1.

The molar ratio Al/Zr is comprised between about 100 and about 10000, preferably between 500 and 5000, more preferably between 500 and 2000.

Non-limitative examples of the alkyl-Al compound are: Al(iBu)$_3$, AlH(iBu)$_3$, Al(iHex)$_3$, Al(C$_6$H$_5$)$_3$, Al(CH$_2$C$_6$H$_5$)$_3$, Al(CH$_2$CMe$_3$)$_3$, Al(CH$_2$SiMe$_3$)$_3$, AlMe$_2$iBu, AlMe(iBu)$_2$.

The hydrocarbon solvent used in the polymerisation can be both aromatic, such as for example toluene, or aliphatic such as for example, pentane, hexane, cyclohexane, heptane.

The polymerisation temperature is generally comprised between 0 and 100° C., preferably between 20 and 60° C.

The molecular weight of the copolymers of the invention can be controlled, for example, using a molecular weight regulator, among which hydrogen is preferred.

The dienes or polyenes used are preferably selected among non-conjugated linear diolefins such as 1,4-hexadiene, or internal-bridged cyclic diolefins, such as 5-ethylidene-2-norbornene.

Characterisation

The thermal behaviour of the polymer is analyzed on a sample as polymerized, by means of Differential Scanning Calorimetry, according to the following procedure: first scanning stroke from T$_1$=−20° C. to T$_2$=180° C., with a heating rate of 20° C./minute.

The content of bound ethylene is determined by means of infrared analysis.

The content of propylenic triads was determined by means of $^{13}$C-NMR, with reference to the methine T$_{\beta\beta}$, as already reported in "G. J. Ray, P. E. Johnson, J. R. Knox, Macromolecules, 10, 4, 773(1977)". The reported numeric values refers to the content of propylene.

The content of isotactic triads is determined by means of $^{13}$C-NMR, by applying the following formula:

$$\text{Iso}\% = (A[T_{62\,\beta}]_{mm})/(A[T_{\beta\beta}]_{mm} + A[T_{\beta\beta}]_{mr} + A[T_{\beta\beta}]_{rr}),$$

wherein A is the area subtended under the peaks relevant to tertiary carbon atoms (T$_{\beta\beta}$); mm, mr and rr respectively are the isotactic, heterotactic and syndiotactic triads.

The product of the reactivity ratios r$_1$·r$_2$ (r$_1$ is the reactivity ratio of ethylene, r$_2$ of propylene ) is calculated by means of the following formula:

$$r_1 \cdot r_2 = 1 + f \cdot (x+1) - (f+1) \cdot (x+1)^{1/2},$$

in which f=(ethylene mols/propylene mols)$_{copolymer}$;

x=ratio between the percentage of propylene in two or more consecutive units and percentage of isolated propylene.

The values of tension set and were determined on samples obtained of plates having the dimensions of 120×120×1.18 mm compression moulded in a press of the Carver type at a temperature of 200° C. and a pressure of 200 Kg/cm$^3$. The moulded material was cooled to room temperature maintaining the same pressure. Samples were obtained from the so obtained plates for the tension set test, having a length of L$_o$=50 mm and a width of 2 mm with a coarsening at the ends for the attachment to the traction apparatus.

The samples were stretched to a length of 100 mm maintained under traction for 1 minute and then released; after 1 minute the final length L was measured. The tension set values were determined according to the formula:

$$TS_{200\%} = [(L-L_o)/L_o] \cdot 100$$

The values reported in table 2 were obtained through arithmetic from the values obtained in test 3.

The solubility in pentane is determined as follows: 2 g of polymer is placed in 250 ml of n-pentane; the mixture is heated to boiling temperature, whilst stirring, for 20 minutes and is left to cool to 25° C. whilst stirring. After 30 minutes the resulting mixture is filtered through a pleated filter; after vacuum drying, the portion of insoluble polymer is determined.

The intrinsic viscosity is determined in tetralin at 135° C.

The molecular weight distribution M$_w$/M$_n$ has been determined by GPC.

The following examples are supplied for illustrative and non-limitative purposes of the invention.

EXAMPLES

Preparation of the Catalytic System

Ethylene-bis(tetrahydroindenyl)-zirconium dichloride (EBTHIZrCl$_2$) is prepared by following the method described in H. H. Britzinger et al., J.Organomet.Chem., 288, p.63, (1985).

General Polymerization Procedure

To a 4 liter steel autoclave 2 liters of hexane, propylene, ethylene and optionally hydrogen, according to the amounts reported in table 1, were added at room temperature. The temperature was raised to 50° C. and 10 cm$^3$ of a toluene solution of the zirconium compound, Al(iBu)$_3$ and water were added in the amounts specified in table 1. During the reaction a continuous addition of the ethylene/propylene mixture in a 60/40 ratio by weight was added in amounts so as to maintain constant pressure in the autoclave. After 60 minutes the reaction was stopped by feeding 600 cm$^3$ of CO. The solution containing the polymer was discharged into a 5 liter recipient containing 3 liters of acetone. The solid polymer produced was dried in an oven at 70° C.

EXAMPLE 1–5

By following the above reported general methodology, some polymerization tests are carried out, under such operating conditions as reported in table 1.

In Table 2, the characterization of the resulting polymer is reported.

TABLE I

| Eg. (n°) | Zr (mmol.$10^{-3}$) | Al/Zr (mols) | Al/$H_2O$ (mols) | POLYMERISATION $C_2$/liq (% wt) | $C_2$/gas (mol %) | $C_2$/liq (wt %) | $C_2$/gas (mol %) | $H_2$/gas (mol %) | activity $Kg_{pol}/g_{Zr}$ |
|---|---|---|---|---|---|---|---|---|---|
| 1 | 1.88 | 890 | 1.8 | 2.33 | 39.0 | 19.8 | 56.0 | — | 204.7 |
| 2 | 1.88 | 1000 | 2 | 2.0 | 34.0 | 21.7 | 61.3 | — | 175.4 |
| 3 | 1.88 | 890 | 1.8 | 2.0 | 34.0 | 21.7 | 61.3 | 0.016 | 251.5 |
| 4 | 1.88 | 890 | 1.8 | 1.68 | 28.0 | 24.2 | 67.5 | — | 181.3 |
| 5 (comp.) | 1.88 | 890 | 1.8 | 2.0 | 34.0 | 21.7 | 61.3 | 0.031 | 233.9 |

TABLE 2

| Example (n°) | % $C_2$ (wt.) | I.V. (dl/g) | $M_w/M_n$ | DSC I scans M.P. (°C.) | $H_f$ | NMR Analysis triads (%) | % iso | $r_1, r_2$ | Solubility (% wt.) sol. | ins. | Tension Set (%) |
|---|---|---|---|---|---|---|---|---|---|---|---|
| 1 | 68.9 | 5.74 | 1.9 | 39.4 | 11.5 | 3.76 | 100 | 0.512 | 100 | — | 15 |
| 2 | 63.4 | 5.39 | 2.1 | — | — | — | | | 100 | — | 4 |
| 3 | 60.6 | 3.82 | 2.0 | — | — | 8.19 | 100 | 0.464 | 100 | — | 10 |
| 4 | 55.5 | 3.56 | 2.2 | — | — | 9.80 | 100 | 0.453 | 100 | — | 10 |
| 5 (comparison) | 60.7 | 2.89 | 2.0 | — | — | 6.87 | 100 | 0.456 | 100 | — | 25 |

What is claimed is:

1. Copolymers of ethylene with propylene containing from 55 to 70% by weight of ethylene, from 30 to 45% by weight of propylene, the copolymers excluding the presence of units derived from dienes or polyenes, the copolymers displaying the following properties:
   (a) crystallinity content, as measured as fusion enthalpy, lower than 15 J/g;
   (b) solubility in pentane at 25° C. higher than 95%;
   (c) content of propylenic units in the form of triads between 3 and 10% of propylene; at least 70% of the triads displaying an isotactic structure;
   (d) product of monomer reactivity ratio $r_1 r_2$ from 0.4 to 0.6 where $r_1$ is the reactivity ratio of ethylene, and $r_2$ is the reactivity ratio of propylene;
   (e) intrinsic viscosity higher than 3 dl/g; and
   (f) tension set, measured at 200%, 20° C. for 1 minute, of less than 15%.

2. Copolymers according to claim 1, having an intrinsic viscosity higher than 3.5 dl/g.

3. Manufactured articles comprising the copolymers according to claim 1.

4. The copolymers of claim 1, containing from 58 to 65% by weight of ethylene.

5. The copolymers of claim 1, containing from 35 to 42% by weight of propylene.

6. The copolymers of claim 1, containing from 58 to 65% by weight of ethylene, and further containing from 35 to 42% by weight of propylene.

7. A process for the preparation of the copolymers of claim 1, wherein the copolymer is prepared by contacting ethylene and propylene with a chiral catalyst comprising a zirconium metallocene derivative and an alkyl-Al compound in an inert hydrocarbon solvent in the present of water in amounts such to have a molar ratio of Al/$H_2O$ higher than 1:1 and lower than 100:1.

8. The process according to claim 7, wherein the metallocene is selected from the group consisting of ethylene-bis (tetrahydroindenyl)-zirconium dichloride or dimethylsilanylene-bis(tetrahydroindenyl)-zirconium dichloride.

9. The process according to claim 7, wherein the alkyl-Al compound is selected from the group consisting of Al(iBu)$_3$, AlH(iBu)$_2$, Al(iHex)$_3$, Al($C_6H_5$)$_3$, Al($CH_2C_6H_5$)$_3$, Al($CH_2CMe_3$)$_3$, Al($CH_2SiCMe_3$)$_3$, AlMe$_2$iBu, and AlMe(iBu)$_2$.

10. The process according to claim 9, wherein the molar ratio of Al/$H_2O$ is from 1:1 to 50:1.

11. The process according to claim 7, wherein the metallocene is selected from the group consisting of ethylene-bis(tetrahydroindenyl)-zirconium dichloride or dimethylsilanylene-bis(tetrahydroindenyl)-zirconium dichloride, the alkyl-Al compound is selected from the group consisting of Al(iBu)$_3$, AlH(iBu)$_2$, Al(iHex)$_3$, Al($C_6H_5$)$_3$, Al($CH_2C_6H_5$)$_3$, Al($CH_2CMe_3$)$_3$, Al($CH_2SiCMe_3$)$_3$, AlMe$_2$iBu, and AlMe(iBu)$_2$, and molar ratio of Al/$H_2O$ is from 1:1 to 50:1.

* * * * *